(12) United States Patent
Avila et al.

(10) Patent No.: US 11,744,224 B2
(45) Date of Patent: Sep. 5, 2023

(54) ANIMAL SPRAYING DEVICES, SYSTEMS AND METHODS OF USE

(71) Applicant: Avran Industrial, Inc., Visalia, CA (US)

(72) Inventors: Vernon M. Avila, Visalia, CA (US); David A. Melvin, Springville, CA (US)

(73) Assignee: Avran Industrial, Inc., Visalia, CA (US)

( * ) Notice: Subject to any disclaimer, the term of this patent is extended or adjusted under 35 U.S.C. 154(b) by 198 days.

(21) Appl. No.: 17/195,200

(22) Filed: Mar. 8, 2021

(65) Prior Publication Data

US 2021/0204506 A1 Jul. 8, 2021

Related U.S. Application Data

(63) Continuation of application No. 15/891,859, filed on Feb. 8, 2018, now Pat. No. 10,939,664.

(Continued)

(51) Int. Cl.
*A01K 1/00* (2006.01)
*A61D 7/00* (2006.01)
(Continued)

(52) U.S. Cl.
CPC ............ *A01K 1/0082* (2013.01); *A01K 13/00* (2013.01); *A01K 13/001* (2013.01); *A61D 7/00* (2013.01); *A01K 7/06* (2013.01); *A01K 13/003* (2013.01)

(58) Field of Classification Search
CPC .... A01K 1/0082; A01K 13/00; A01K 13/001; A01K 13/003; A01K 7/06; A61D 7/00;
(Continued)

(56) References Cited

U.S. PATENT DOCUMENTS 831,226 A * 9/1906 Hinkson ................ H01H 35/38
200/82 R
1,475,697 A * 11/1923 Hartman ................ H01H 35/40
200/82 C (Continued)

FOREIGN PATENT DOCUMENTS

CN 103718978 A 4/2014
CN 104023523 A 9/2014
(Continued)

OTHER PUBLICATIONS

Extended European Search Report from co-pending EPO application 18750607.6 dated Apr. 22, 2020.

(Continued)

*Primary Examiner* — Ebony E Evans
(74) *Attorney, Agent, or Firm* — SIERRA IP LAW, P.C.; Mark D. Miller

(57) ABSTRACT

The present invention provides a novel and improved animal sprayer for use in cooling livestock and other animals in different hot or dry environments, and methods of using the same. Embodiments of the novel animal sprayers may include a valve which does not require constant electric current to remain open during a spraying session, extending system battery life. The valves may also be self-cleaning, less likely to leak, and easily adjusted to control flow rate, reducing both water use and labor costs in monitoring and repairing the animal sprayer.

23 Claims, 10 Drawing Sheets

Related U.S. Application Data

(60) Provisional application No. 62/457,744, filed on Feb. 10, 2017, provisional application No. 62/456,616, filed on Feb. 8, 2017.

(51) Int. Cl.
*A01K 13/00* (2006.01)
*A01K 7/06* (2006.01)

(58) Field of Classification Search
CPC .... H01H 35/38; H01H 35/2607; H01H 35/34; G01P 13/00
See application file for complete search history.

(56) References Cited

U.S. PATENT DOCUMENTS

| | | | |
|---|---|---|---|
| 2,077,766 A | 4/1937 | Mead | |
| 3,118,030 A * | 1/1964 | Palen | H01H 35/38 200/82 C |
| 3,884,192 A | 5/1975 | Knapp | |
| 4,081,621 A * | 3/1978 | Hartley | H01H 35/34 200/83 T |
| 4,334,504 A * | 6/1982 | Matthews | A01K 13/003 119/667 |
| 4,556,799 A * | 12/1985 | Rolando | G01P 15/093 250/577 |
| 5,009,192 A * | 4/1991 | Burman | A01M 29/30 239/69 |
| 5,063,880 A | 11/1991 | Bouthillier | |
| 5,292,232 A * | 3/1994 | Krohn | H01H 35/38 200/82 C |
| 5,458,093 A * | 10/1995 | MacMillan | A01G 13/10 119/720 |
| 5,501,179 A * | 3/1996 | Cory | A01M 29/12 119/712 |
| 5,630,379 A | 5/1997 | Gerk et al. | |
| 5,878,956 A * | 3/1999 | Djukastein | B05B 12/122 446/175 |
| 5,934,221 A * | 8/1999 | Kirschner | A01K 7/02 119/72 |
| 5,988,113 A | 11/1999 | Zhioua et al. | |
| 6,029,610 A * | 2/2000 | Ramsey | A01K 13/001 119/651 |
| 6,202,594 B1 | 3/2001 | Kirschner | |
| 6,230,660 B1 | 5/2001 | Greeson | |
| 6,520,118 B2 | 2/2003 | Swiegers et al. | |
| 6,615,769 B2 | 9/2003 | Zhioua | |
| 7,021,555 B2 * | 4/2006 | Bagnall | A01K 1/0082 239/69 |
| 7,306,167 B2 | 12/2007 | Colarusso et al. | |
| 7,462,364 B2 * | 12/2008 | Bell | A01M 29/16 424/405 |
| 9,339,009 B1 | 5/2016 | Larson | |
| 10,264,781 B2 * | 4/2019 | Ryan | B05B 1/00 |
| 10,939,664 B2 | 3/2021 | Avila et al. | |
| 11,197,461 B2 * | 12/2021 | Weimin | A01K 15/022 |
| 2002/0179020 A1 * | 12/2002 | Zhioua | A01K 13/003 119/666 |
| 2004/0182950 A1 | 9/2004 | Duranceau | |
| 2009/0314216 A1 | 12/2009 | Polak | |
| 2011/0253224 A1 | 10/2011 | Linder et al. | |
| 2012/0000932 A1 | 1/2012 | Carpenter | |
| 2012/0039723 A1 * | 2/2012 | Gresham | F04B 49/022 417/44.2 |
| 2014/0263687 A1 | 9/2014 | Rich et al. | |
| 2014/0264111 A1 | 9/2014 | Porter et al. | |
| 2014/0299069 A1 | 10/2014 | Greeson | |
| 2016/0341410 A1 | 11/2016 | Khon | |
| 2017/0344031 A1 * | 11/2017 | Tuineag | F16K 3/06 |

FOREIGN PATENT DOCUMENTS

| | | | |
|---|---|---|---|
| CN | 102971076 B | 11/2015 | |
| DE | 202014105171 | 12/2014 | |
| DE | 202014105171 U1 | 12/2014 | |
| GB | 1506434 A | 4/1978 | |
| GB | 2457533 A | 8/2009 | |
| GB | 2524589 A * | 9/2015 | E03B 7/071 |
| JP | H0666614 A * | 8/1992 | G01F 3/10 |
| WO | 2013100850 A1 | 7/2013 | |
| WO | WO-2021142071 A1 * | 7/2021 | A01K 7/06 |

OTHER PUBLICATIONS

Edstrom, Cool Sense Motion Cooling System, www.agselect.com.
Mario Mongeon, Ministry of Agriculture, Food and Rural Affairs, Ontario; Cooling Cows; Raminations column of The Milk Producer Magazine, Aug. 2011.
Clain Malek, Cows of Dubai farm get cold showers to produce more milk, Apr. 4, 2013, The National, United Arab Emirates.
International Search Report (ISR) and Written Opinion from co-pending PCT application PCT/US2018/017452 dated Apr. 26, 2018 (PCT/ISA/220 and PCT/ISA237).
NPL_Abstract_Translation_DE202014105171U1, https://translationportal.epo.org/emtp/translate/?ACTION=abstract-retrieval&COUNTRY=DE&ENGINE=google&FORMAT=docdb&KIND=U1&LOCALE=en_EP&NUMBER=202014105171&SRCLANG=de&TRGLANG=en, accessed = Mar. 9, 2021.
NPL_Abstract_Translation_CN103718978, https://worldwide.espacenet.com/patent/search/family/050443474/publication/CN103718978A?q=pn%3DCN103718978A, accessed = Mar. 9, 2021.
GB 1506434, previously submitted.
GB 2457533, previously submitted.
Translation of CN 103718978 A.
Translation of DE 20 2014 105 171 U1.
Translation of CN 104023523 A.
Translation of CN 102971076 A.
WO 2013/100850 A1.

* cited by examiner

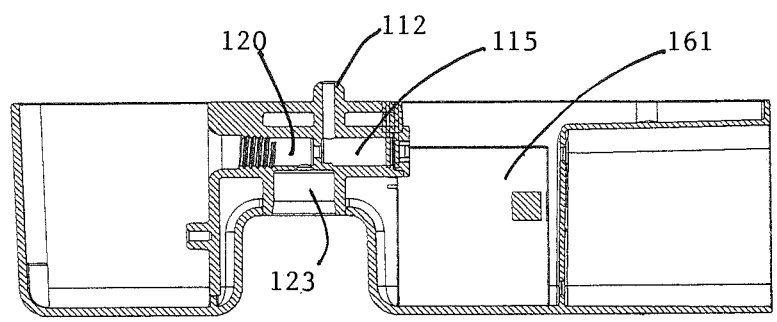
FIG. 11   Section A-A
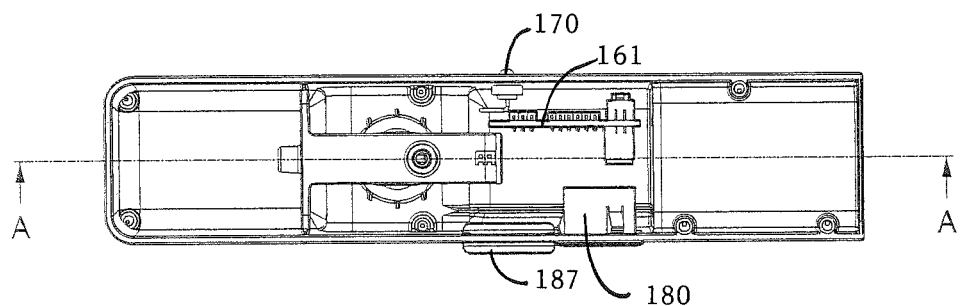
FIG. 10
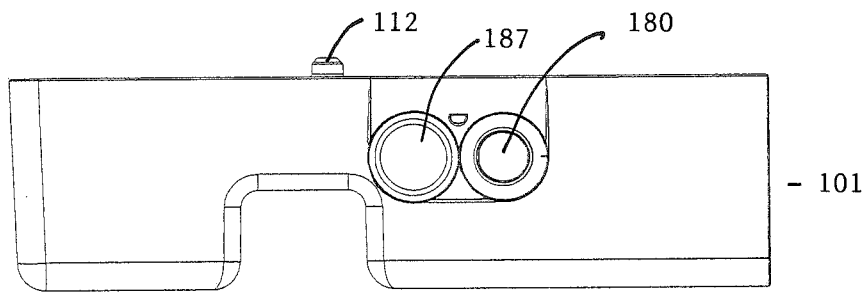
FIG. 9

ANIMAL SPRAYING DEVICES, SYSTEMS AND METHODS OF USE

PRIORITY CLAIM

This is a continuation of U.S. patent application Ser. No. 15/891,859 filed on Feb. 8, 2018, which is a non-provisional of and claims the benefit of U.S. Provisional Application No. 62/456,616 filed on Feb. 8, 2017, and which is also a non-provisional of and claims the benefit of U.S. Provisional Application No. 62/457,744 filed on Feb. 10, 2017, all of which applications are incorporated herein by this reference in their entireties.

FIELD OF THE INVENTION

The present invention relates to new and improved sprayers and systems used for cooling animals, and methods of using the same. The sprayers and systems of the present invention conserve water and energy and provide adjustability, while minimizing clogging, leaks, down time, monitoring and maintenance in livestock and other animal housing environments.

BACKGROUND OF THE INVENTION

There are various industries and operations which house large animals (e.g. dairies, zoos, equine ranches, and the like which may house cattle, horses, swine, or other livestock), and which are based in localities having hot outdoor climates, especially during the summer. Such operations may rely on an animal spraying system which cools the animals during hotter hours of the day by sprinkling the animals with water. However, water usage at such operations may come at a premium as access to water lessens and water costs increase during periods of high demand, and water availability may be restricted due to drought-like conditions and mandated rationing. Such operations would benefit from automated animal spraying systems that provide a predictable demand for water, thereby improving system water pressure, and conserving water and energy.

Conventional water spraying systems rely on solenoid or butterfly valve actuators to control water flow. A typical solenoid actuator is a magnetically controlled binary valve wherein a valve is either completely open or completely closed. The solenoid is operated by sending electric current through a coil to magnetize a piston, which then pushes against a spring to hold the valve open. Because the spring is always pushing against the piston, the valve requires constant electrical current to remain open. This setup is not ideal for battery operated sprayer systems, as it uses energy during the entire spraying session. Further, the volume of water allowed through the valve is not adjustable, as the valve only has a full on or full off position. Thus, other apparatus would be required to optimize the volume of water used for spraying and/or animal cooling.

A typical butterfly valve operates by sliding a flat metal seal along a surface. The seal and the surface each have a circular hole, and when the holes are aligned water is allowed through. Due to the irregular shape of the opening created as the circular hole in the seal slides into position over the circular shape of the surface, the flow rate of water through a butterfly valve is not linearly proportional to the movement of the seal. Thus, making slight adjustments to the flow rate through a butterfly valve is not easy and may require personal monitoring. Further, due to the shape of the pathway created by a butterfly valve wherein turbulence is created by water pushing against and flowing past a flat metal sheet, a butterfly valve is more susceptible to developing leaks and accumulating debris on the outer surface of the seal. This makes butterfly valves unsuitable for use in dusty, dirty environments such as dairy farms or zoos.

There is therefore a need for automatic animal water spraying systems having adjustable valves that are suitable for dusty dirty conditions, with actuators that do not require constant electric current to hold valves open during a spraying session, and which control the timing of spraying sessions, so as to conserve water and energy and provide adjustability, while minimizing clogging, leaks, down time, monitoring and maintenance. Operations engaged in housing large animals in hot environments subject to droughts and water rationing would be aided by animal cooling systems which reduce water use and maintenance costs while providing consistent water pressure and reliability.

SUMMARY OF THE INVENTION

The present invention provides animal spraying systems and related methods for use in industries and activities such as cattle ranches, dairies, swine or equine ranches, zoos, and the like, to provide automatic, low maintenance, water conserving and energy efficient spraying of animals to cool the animals during hot weather. Embodiments of the animal spraying systems and methods of the present invention may include a unitary device for attachment to an existing main water line, the device comprising a valve with a valve body and a valve stem which may be self-cleaning, a motor for turning the valve stem, a pressure switch for recognizing a threshold water pressure (e.g., 5 psi), a sensor for detecting an animal, a power source, an optional voltage indicator for showing that the power source has dropped below a predetermined voltage (e.g. below 7.4 volts), and a microcontroller for (1) receiving electric current from a first circuit via the pressure switch, (2) sending a signal to a first transistor switch to close a second circuit, (3) sending a signal to a second transistor switch to activate the sensor, (4) receiving a positive detection signal from the sensor, (5) controlling the motor, and optionally (6) activating the low voltage indicator.

Embodiments of the present invention may also include a housing to support and protect the valve, pressure switch, motor, sensor, power source, microcontroller, first transistor switch, second transistor switch, and voltage indicator. The housing may be made of a rigid material such as metal or plastic, having a bottom with a shape that is complementary to the shape of a water pipe, such that the housing may be securely installed on, and tap into, the water pipe. The housing may be installed on the water pipe by tapping said water pipe and creating a watertight seal between the water pipe and an inlet of the valve body. The watertight seal may comprise a weld, a gasket, a threaded connection, a pipe adhesive (e.g. pipe glue), or other suitable sealing material or combination(s) thereof. The water pipe may then provide water pressure to the inlet.

Water pressure in the main water pipe is controlled separately from the present invention, and a plurality of the devices of the present invention may be placed on such a pipe. The main water pipe may be controlled by a separate pump with or without a timer, such that water pressure is provided at whatever times are desired. For example, and without limitation, water may be continuously provided in the main pipe in extremely hot and dry climates; in other climates, water may only be provided during a predetermined time of day (e.g. during the hottest time of the day), and/or only for predetermined periods of time (e.g., for 15 minutes, or 30 minutes, or 1 hour, etc.), or at pre-determined intervals (e.g., 15 minutes every hour; 15 minutes every 2 hours; 15 minutes every 4 hours; etc), thus creating one or more spraying periods. There may be one spraying period in a day, or a plurality of spraying periods in a day; and the spraying period(s) may last for only a few minutes or up to several hours. Utilization of the spraying period may reduce wear on the animal spraying device, reduce the chance for leaks, and help conserve water. As discussed more fully below, it is to be appreciated that embodiments of the present invention are not activated until there is water pressure in the main pipe, according to whatever schedule has been set for pressurizing that pipe.

Embodiments of the valve body may have an inlet chamber connected to the inlet, the inlet chamber housing a pressure activated piston which, when the water pipe provides the threshold water pressure to the inlet during the spraying period, activates the pressure switch. The pressure switch may then close a first circuit between the power source and a microcontroller, allowing the microcontroller to enter a startup mode wherein the microcontroller is operable to: (1) boot up; (2) signal a first transistor switch to close a second circuit; (3) signal the motor to close the valve; and (4) signal a second transistor switch to activate the sensor. It is to be appreciated that until the pressure switch is activated by the presence of the threshold water pressure in the water pipe, there is no drain on battery power.

After completing startup mode, embodiments of the animal sprayer device may enter a spraying mode, wherein it checks for the presence of an animal. The sensor may detect an animal in the target area of the spraying system and send a positive detection signal to the microcontroller, causing the microcontroller to activate the motor, opening the valve and allowing water to spray the animal. The sensor may then continue to monitor the target area, and when the animal leaves the target area the sensor may send a negative detection signal to the microcontroller. The microcontroller may then cause the motor to close the valve, conserving water when an animal is not present to be sprayed. The sensor may also have the effect of deterring pests by emitting ultrasonic waves which are offensive to avian or rodent pests, causing the pests to leave the vicinity of the animal sprayer. It is to be appreciated that in sine embodiments of the invention, one or more proximity sensors may be employed. It is also to be appreciated that in some embodiments of the invention, the proximity sensor(s) may be set so as to only detect large animals (such as livestock) as opposed to small animals (such as rodents).

In embodiments of the invention, an inlet chamber of the valve body may house a spring which pushes back against the pressure activated piston, such that when the spraying period ends (when water in the pipe no longer provides the threshold water pressure to the inlet, e.g. when the pump is shut off), the piston no longer engages the pressure switch. The pressure switch may then open the first circuit between the power source and the microcontroller.

At this point, in embodiments of the invention, the microcontroller, the motor, and the sensor may all still receive power via the second circuit. In such embodiments, the microcontroller may continuously monitor the voltage coming from the first circuit, and enter a shut-down mode upon the first circuit being opened. In shut-down mode, the microcontroller may be operable to: (1) signal the motor to close the valve; and (2) signal the first transistor switch to open the second circuit, shutting off power to the microcontroller. Together, these functions may prevent residual water use, assist in quickly bringing up good water pressure from the water pipe at the next spraying period, and conserve power from the power source between spraying periods.

Embodiments of the valve body may also include an outlet chamber, the outlet chamber having an inner surface with threading which is complementary to threading on an outer surface of the valve stem. The valve stem may have a gear at its base complementary to a gear of the motor, such that as the motor turns, the valve stem is threaded into or out of the outlet chamber of the valve body. The valve stem may also have a substantially hemispherical plug at its tip with an outer diameter which is complementary to a tapered end of a sealing passage between the inlet chamber and the outlet chamber of the valve body. Thus, when the valve stem is threaded into the outlet chamber, the plug engages the sealing passage and the valve is closed. Conversely, when the valve stem is threaded out of the outlet chamber, water is allowed to pass from the inlet chamber through the sealing passage and around the plug in a symmetrical manner. The valve may thus provide a linear increase in water volume as the valve stem is threaded out of the valve body. Further, the valve may be self-cleaning, as the symmetrical water flow through the sealing passage and around the plug prevents buildup of debris or sediment in the valve, decreasing the need for maintenance and the likelihood of developing a leak.

In embodiments of the invention, the outlet may also have a substantially cylindrical shape with an inner surface, the inner surface having threading which is complementary to a threading of a connector of a standard nozzle or service line.

The power source may comprise a battery, although solar or other remotely available power sources may be used. The optional voltage indicator may comprise a light emitting diode (LED) indicator, wherein the LED indicator begins flashing once power coming from the battery drops below the predetermined voltage (e.g., 7.4 volts). Other low-voltage indicators may also be used, including without limitation audio (which emits sound chirps at low voltage), wired or wireless communications, etc. Use of a voltage indicator is preferred, since a typical microcontroller may require a threshold voltage (e.g., 7.2 volts) to function, and may cease to operate when voltage from the power source drops below the threshold voltage.

In embodiments having the voltage indicator, the microcontroller may continuously monitor the voltage level coming from the battery via the first circuit (the first circuit voltage), and when the power level drops below a predetermined voltage (e.g., 7.4 volts), the microcontroller may enter a low power mode and activate the voltage indicator to show that the battery is low. In some embodiments, the animal sprayer device may be capable of operating in low power mode until the first circuit voltage drops below a minimum voltage (e.g. 4.5 volts).

In some embodiments, while in low power mode the animal sprayer device may not enter shut-down mode at the end of a spraying period. Instead, the microcontroller may be operable to send a signal to a second transistor switch to cut off power to the sensor. The second circuit may thus continue to power the voltage indicator to indicate a low power level of the power source, but not power the sensor, conserving battery power.

In embodiments comprising the low power mode, the microcontroller may be programmed to close the valve at the end of a spraying period in order to conserve water, or the microcontroller may be programmed to leave the valve open at the end of a spraying period in order to conserve power. In some embodiments, the animal sprayer device may be operable to exit the low power mode upon the first circuit voltage rising above the threshold voltage.

It is to be appreciated that most embodiments of the present invention are stand-alone units that can be used with any water line, as long as that line provides sufficient pressure. However, in some embodiments an auxiliary or exterior power source may be available, such as, for example, an A/C line from a utility company, or a D/C line from a solar power source. In such cases, the external power source can be used to power embodiments of the invention, instead of the battery, and/or the battery may become a backup power supply if the exterior power source fails. In such embodiments, much longer run times are available since there is no depletion of the battery.

In some embodiments, the present invention is directed to an animal spraying device comprising a valve with a valve body and a valve stem for controlling a flow of water through said valve; a power source; a motor for turning said valve stem; a pressure switch for recognizing a threshold water pressure (e.g., 5 psi) from a water pipe; a sensor for detecting an animal within a target area; a voltage indicator for indicating a low power level; and a microcontroller for (1) receiving electric current from a first circuit via the pressure switch, (2) sending a signal to a first transistor switch to close a second circuit, (3) sending a signal to a second transistor switch to power the sensor, (4) receiving a positive detection signal from the sensor, (5) controlling the motor, and (6) activating the low voltage indicator.

In some embodiments, the present invention may be installed on a water pipe by tapping the water pipe and creating a watertight seal between the water pipe and an inlet of the valve body. The watertight seal may comprise a weld, a gasket, a threaded connection, or a pipe adhesive (e.g. pipe glue), or a combination thereof.

In some embodiments, and without limiting the invention, a valve body may comprise said inlet, an inlet chamber, a seal passage, an outlet chamber, and an outlet. In some embodiments, the inlet may comprise an inlet opening and an inlet passage, the inlet passage allowing fluid communication between said inlet opening and said inlet chamber. In some embodiments, the inlet opening may be in fluid communication with a water pipe via a watertight seal, with the water pipe providing water pressure to said inlet during a spraying period. In some embodiments, the inlet chamber may comprise a substantially cylindrical shape with a proximal end and a distal end. In some embodiments, the inlet passage and the seal passage may be located at the proximal end, and the pressure switch may be located at the distal end.

In some embodiments, a valve body may comprise an inlet with an inlet opening, and an outlet with an outlet opening. In some embodiments, the inlet opening may allow fluid communication between a water pipe and a valve. In some embodiments, the outlet opening may comprise outlet threading, the outlet threading comprising a shape which is complementary to a threading of a standard nozzle or service line, such that the valve may be connected in a watertight manner to the standard nozzle or service line, the standard nozzle or service line directing the flow of water to a target area. In some embodiments, the valve may thus provide fluid communication between the water pipe and the target area.

In some embodiments, an inlet chamber may house a pressure activated piston and a spring. In some embodiments, the spring may be located between a distal end and a pressure activated piston, wherein the spring provides physical resistance against contact between the pressure activated piston and a pressure switch. In some embodiments, a threshold water pressure from a water pipe may overcome physical resistance from the spring, causing the pressure activated piston to contact the pressure switch, closing a first circuit between the power source and the microcontroller.

In some embodiments, an outlet chamber may comprise a substantially cylindrical shape with an inner surface, a proximal end, and a distal end. In some embodiments, a seal passage and an outlet are located at the proximal end. In some embodiments, the outlet chamber may comprise a chamber threading on the inner surface, the chamber threading or bore being located at the distal end.

In some embodiments, the seal passage may comprise a substantially cylindrical shape with a tapered outlet end, the seal passage providing fluid communication between an inlet chamber and an outlet chamber.

In some embodiments, a valve stem may comprise a first end, a second end, and a shaft. In some embodiments, the first end may comprise a head, a neck, and a shoulder, the head and the neck creating a shape complementary to an inner cavity of a plug, wherein the plug fits securely onto the first end. In some embodiments, the plug may comprise the inner cavity and a substantially hemispherical tip. In some embodiments, the substantially hemispherical tip may comprise a shape complementary to a shape of the tapered outlet end of the seal passage, such that when the hemispherical tip contacts the tapered outlet end, a watertight seal is created between the seal passage and the outlet chamber.

In some embodiments, an O-ring may be installed on the shoulder of the valve stem, the O-ring having an inner diameter and an outer diameter. In some embodiments, the inner diameter of the O-ring may be complementary to an outer diameter of the shoulder, and the outer diameter of the O-ring may be complementary to an inner diameter of the outlet chamber, such that a watertight seal is created between the outlet chamber and the valve stem.

In some embodiments, the shaft of the valve stem may comprise a substantially cylindrical shape with an outer surface, the outer surface comprising a stem threading. In some embodiments, the stem threading may comprise a shape complementary to the chamber threading, such that the valve stem may be threaded into the outlet chamber. In some embodiments, the second end of the valve stem may comprise a stem gear, the stem gear comprising a shape complementary to a shape of a motor gear, with the motor gear being connected to the motor.

In some embodiments, the stem gear may be in contact with the motor gear, such that when the motor turns the motor gear a in first direction, the valve stem may be threaded into the outlet chamber, moving along a central axis of the valve stem, and when the motor turns the motor gear in a second direction, the valve stem may be threaded out of the outlet chamber, moving back along the central axis of the valve stem (collectively, an axial movement of the valve stem). In some embodiments, when the valve stem is threaded into the outlet chamber, a plug may come into contact with a seal passage, closing the valve, and when the valve stem is threaded out of the outlet chamber, the plug may disengage from the seal passage, opening the valve. In some embodiments, the flow rate of water passing through the valve may be linearly proportional to an axial movement of the valve stem.

In some embodiments, the motor gear may have an outer diameter substantially greater than an outer diameter of the stem gear, creating a reduction gear transmission between the motor and the valve stem, thus preventing an axial movement of the valve stem during the spraying period, conserving power from the power source.

In some embodiments, an outlet of the valve body may comprise an outlet opening and an outlet passage, the outlet passage allowing fluid communication between the outlet chamber and the outlet opening. In some embodiments, the outlet opening may comprise a cup shape with an inner cylindrical surface. In some embodiments, the inner cylindrical surface may comprise an outlet threading, the outlet threading comprising a shape complementary to a threading of a connector of a standard nozzle or service line.

In some embodiments, the sensor may comprise an ultrasonic sensor and a sensor horn. In other embodiments, the sensor may comprise at least one of a passive infrared sensor, a microwave sensor, an area reflective type sensor, a vibration sensor, or a dual technology sensor. In some embodiments, the ultrasonic sensor may be operable to send out pulses of ultrasonic waves and measure the reflection of an object within a predetermined range of the sensor (e.g., between 6 and 15 feet), the predetermined range representing a target area of the animal sprayer device. In some embodiments, the sensor may be operable to detect only animals meeting a threshold size (e.g., greater than 100 lbs., or having a surface area of more than 12 sq. in.), the threshold size preventing the sensor from detecting smaller animals such as dogs, cats, birds, or rodents.

In some embodiments, the sensor may be provided in a horn that may comprise a substantially L shaped passage with a first end and a second end. In some embodiments, the ultrasonic sensor may be located at the first end, with the second end being open and directed toward the target area. In some embodiments, the sensor may comprise a screen, the screen covering the second end of the sensor horn and protecting the ultrasonic sensor from water and debris. In some embodiments, the sensor may comprise a plurality of ultrasonic sensors and a plurality of sensor horns. In some embodiments, each sensor horn in the plurality of sensor horns may be directed to the target area. In other embodiments, the plurality of sensor horns may comprise a first sensor horn and a second sensor horn, the first sensor horn being directed to a first target area, and the second sensor horn being directed to a second target area. It is to be appreciated that one, two, three or more sensor(s) and associated horn(s) may be provided in different embodiments of the invention.

In some embodiments, the sensor may ping a target area multiple times per second (e.g., 20 times per second), and receive a positive detection if an animal moves into the target area. In some embodiments, the sensor may require multiple consecutive positive detections (e.g., six consecutive positive detections) before recording a valid positive detection. In some embodiments, upon recording a valid positive detection, the sensor may transmit a positive detection signal to the microcontroller, causing the microcontroller to activate the motor and open the valve, spraying the animal.

In some embodiments, upon transmitting a positive detection signal to the microcontroller, the sensor may cease pinging the target area, and the valve may remain open for the duration of the spraying period (i.e., as long as there is water pressure in the main pipe). In other embodiments, the valve may remain open for a predetermined time (e.g., one minute, ten minutes, fifteen minutes, or any other suitable time interval) before the microcontroller activates the motor to close the valve, thereby ending a spraying session. In some embodiments, the animal spraying device may provide zero spraying sessions, or one spraying session, or a plurality of spraying sessions, during a spraying period.

In yet other embodiments, the sensor may continue pinging a target area, and upon receiving multiple consecutive negative detections (e.g. 50 consecutive negative detections) the sensor may record a valid negative detection and send a negative detection signal to the microcontroller, causing the microcontroller to activate the motor and close the valve. In some embodiments, the sensor may then continue pinging the target area for the duration of a spraying period, allowing for a second valid positive detection, thus allowing for multiple animals to be sprayed during one spraying period.

In some embodiments, upon initially receiving power from the first circuit, the microcontroller may automatically transmit a signal to a first transistor switch to close a second circuit between the power source and the microcontroller. Thus, if the spraying period ends and the pressure switch opens the first circuit while the valve is open, the microcontroller may continue receiving power from the second circuit in order to cause the motor to close the valve. After causing the motor to close the valve, the microcontroller may then signal the first transistor switch to open the second circuit, cutting off battery use entirely.

In some embodiments, if the animal sprayer device is in low power mode when the spraying period ends, the microcontroller may not signal the first transistor switch open the second circuit, so that the voltage indicator may continue to receive power in order to signal a low power level in between spraying periods. In some embodiments, if the animal sprayer device is in low power mode, the microcontroller may not close the valve when the spraying period ends, thus conserving power and ensuring that the valve is in an open position for the next spraying period. In other embodiments, the microcontroller may close the valve at the end of the spraying period irrespective of whether the animal sprayer device is in low power mode.

In some embodiments, the pulses of ultrasonic waves transmitted by the sensor may also have the effect of deterring pests. The ultrasonic waves may be offensive to avian and rodent pests within a deterrent area (e.g., within 1 to 48 inches, or up to several feet) around the animal sprayer device, causing the pests to leave the deterrent area and thus leave the vicinity of the animal sprayer. The sensor may thus prevent damage to the animal sprayer caused by physical contact by the pests, and prevent pest droppings in the vicinity of the animal sprayer.

In some embodiments, the sensor may receive power via either the first circuit or the second circuit, via a second transistor switch. In such embodiments, the second transistor switch may be operable to transfer power to the sensor upon receiving an activation signal from the microcontroller, or a cut off power to the sensor upon receiving a deactivation signal from the microcontroller. In some embodiments, the microcontroller may automatically send the activation signal to the second transistor switch upon the microcontroller entering startup mode. In some embodiments, the microcontroller may send the deactivation signal to the second transistor switch upon entering low power mode.

In some embodiments, the power source may comprise a battery. In some embodiments, the battery may comprise a plurality of commercially available batteries (e.g., AAA, AA, C, or D batteries, etc.). In other embodiments, the battery may comprise a removable and rechargeable system battery. In some embodiments, the power source may be in electronic communication with the pressure switch, the pressure switch being in electronic communication with the microcontroller. In some embodiments, the pressure switch may be capable of opening or closing a first circuit between the power source and the microcontroller. In some embodiments, the pressure switch may open a first circuit when the pressure activated piston is not in contact with the pressure switch (i.e., detecting the absence of water pressure, thereby preventing the valve from operating), and close the first circuit when the pressure activated piston is in contact with the pressure switch (i.e. detecting the presence of the threshold water pressure, such that the valve may be operable for spraying if an animal which comes into the target area).

In some embodiments, the battery may further be in electronic communication with a first transistor switch, the first transistor switch being in electronic communication with the microcontroller. In some embodiments, the first transistor switch may be capable of closing a second circuit between the power source and the microcontroller. In some embodiments, the first transistor switch may close the second circuit upon receiving a signal from the microcontroller, thus bypassing the first circuit. In some embodiments, upon receiving power via the first circuit, the microcontroller may automatically signal the first transistor switch, opening the second circuit.

In some embodiments, the microcontroller may continuously monitor the voltage coming from the power source via the first circuit, and enter a low power mode upon the first circuit voltage dropping below a predetermined voltage. In some embodiments, upon entering low power mode the microcontroller may not signal the first transistor switch to open the second circuit at the end of a spraying period, thus keeping the second circuit closed for the purpose of powering a voltage indicator. In some embodiments, in low power mode and at the end of a spraying period, the microcontroller may signal a second transistor switch to shut off power to the sensor, conserving battery power.

In some embodiments, the voltage indicator may comprise a light emitting diode (LED) indicator and be operable to receive power from the microcontroller. In some embodiments, upon receiving a signal from the microcontroller, the LED indicator may be operable to pulse at a regular interval (e.g. one 0.5 second pulse every five seconds). In some embodiments, the LED indicator may continue to pulse at regular intervals until the microcontroller exits low power mode and signals the LED indicator to shut off. In some embodiments, the animal sprayer device may be capable of operating in low power mode until the first circuit voltage drops below a minimum voltage (e.g. 4.5 volts).

In some embodiments, the microcontroller may comprise a central processing unit (CPU), the CPU being in electronic communication with a pressure switch, a first transistor switch, a second transistor switch, a motor, a sensor, and a voltage indicator. In some embodiments, the microcontroller may be operable to receive power from a power source via a first circuit and a second circuit, the first circuit being opened or closed by the pressure switch, and the second circuit being opened or closed by the first transistor switch. In some embodiments, the pressure switch may close the first circuit upon the water pipe delivering water pressure to the valve during a spraying period, and open the first circuit upon the cessation of said threshold water pressure from the water pipe at the end of the spraying period.

In some embodiments, the microcontroller may be operable to: (1) receive power from the power source via the closing of the first circuit; (2) signal the first transistor switch to close the second circuit; (3) automatically transmit a negative detection signal to the motor to initially close the valve and conserve water; (4) send a signal to the second transistor switch to activate the sensor; (5) receive a positive detection signal from the sensor upon an animal entering the target area; (6) transmit a positive detection signal to the motor to open the valve; (7) receive a negative detection signal from the sensor upon the animal leaving the target area; (8) transmit a negative detection signal to the motor to close the valve and conserve water; (9) monitor the first circuit voltage; (10) upon the first circuit voltage dropping below a predetermined voltage, enter low power mode and activate the voltage indicator, causing the voltage indicator to pulse at a regular interval; (11) upon the first circuit being opened while not in low power mode, close the valve and signal the first transistor switch to open the second circuit; (12) upon the first circuit being opened while in low power mode, either close the valve to conserve water or leave the valve open to conserve power, and signal the second transistor switch to cut off power to the sensor, conserving battery power; and (13) upon the first circuit voltage rising above the predetermined voltage, exit low power mode.

Some embodiments of the invention may comprise a housing. In such embodiments, the housing may comprise a rigid material (e.g., plastic or metal) and may comprise openings for an inlet, an outlet, a sensor, and a voltage indicator. In some embodiments, the housing may further comprise a bottom surface with at least one attachment tab, and a pipe gasket, the pipe gasket comprising an upper surface, a rounded first end, and a rounded second end. In some embodiments, the upper surface may comprise a substantially flat shape, a passage for the inlet, and at least one attachment slot for attaching to the at least one attachment tab. In some embodiments, the rounded first end and the rounded second end may each comprise a shape which is complementary to an outer surface of the water pipe.

Additional aspects and objects of the invention will be apparent from the detailed descriptions and the claims herein.

BRIEF DESCRIPTION OF THE DRAWINGS

FIG. 9 is a side view of an alternative embodiment of the present invention.

FIG. 10 is a bottom cut-away view of the embodiment of FIG. 9.

FIG. 11 is a side sectional view along line A-A of FIG. 10.

DETAILED DESCRIPTION

Figure 1:
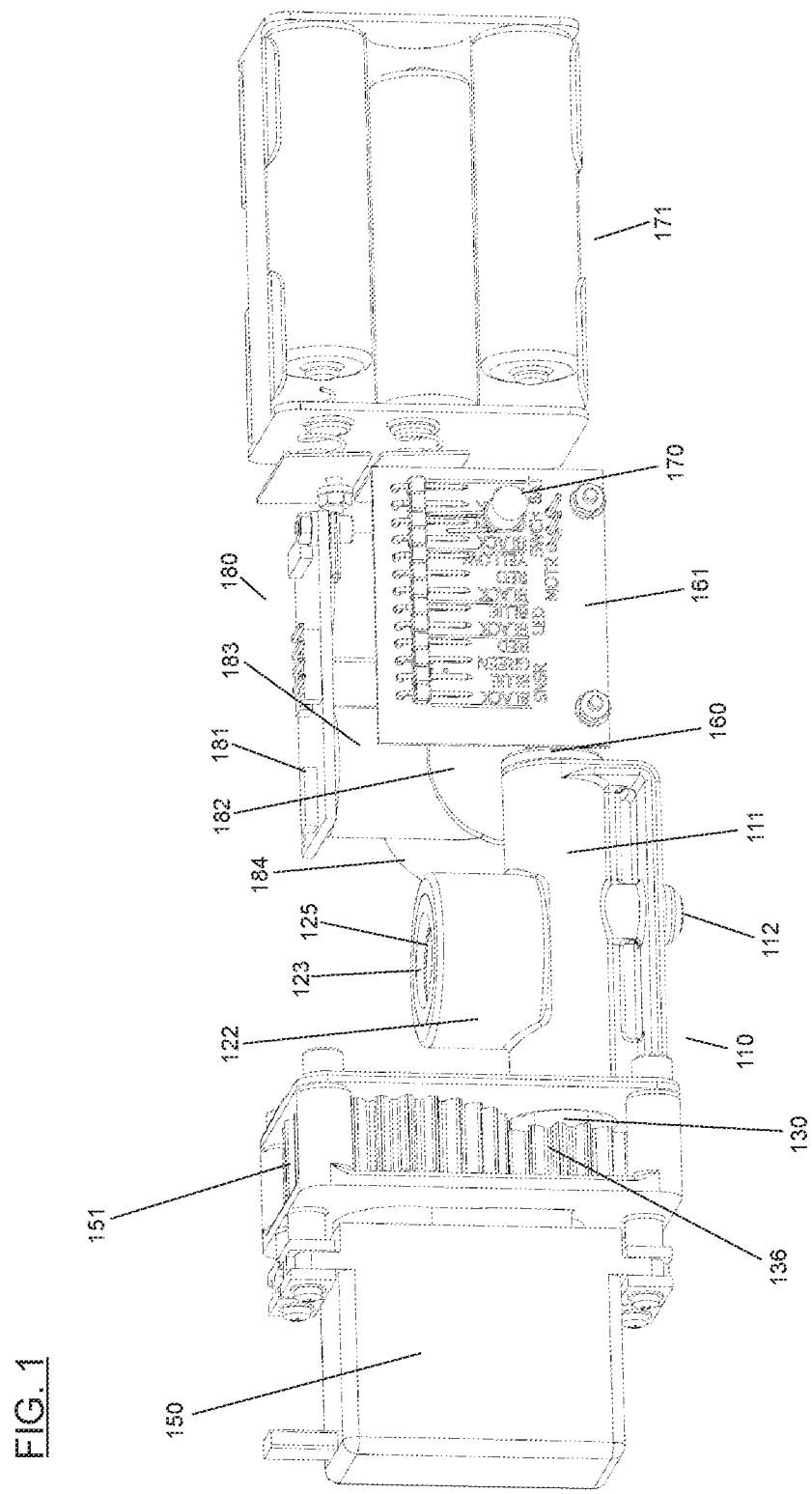
FIG. 1 is a perspective view of an animal sprayer device according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring now to the drawings wherein like reference characters designate like or corresponding parts throughout the several views, it is seen that the present invention includes various embodiments of an animal sprayer or soaker device. It is also evident in the drawings that the invention includes methods of using the animal sprayer or soaker device.

Figure 2:
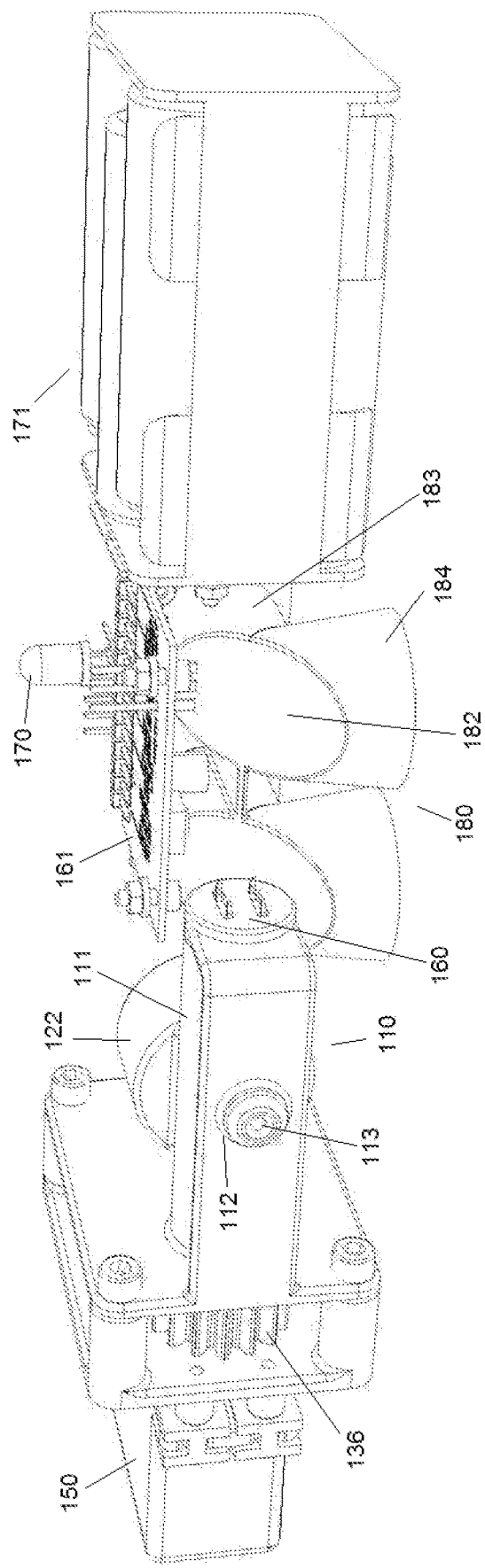
FIG. 2 is a perspective view of an animal sprayer device according to an embodiment of the present invention.
Figure 3:
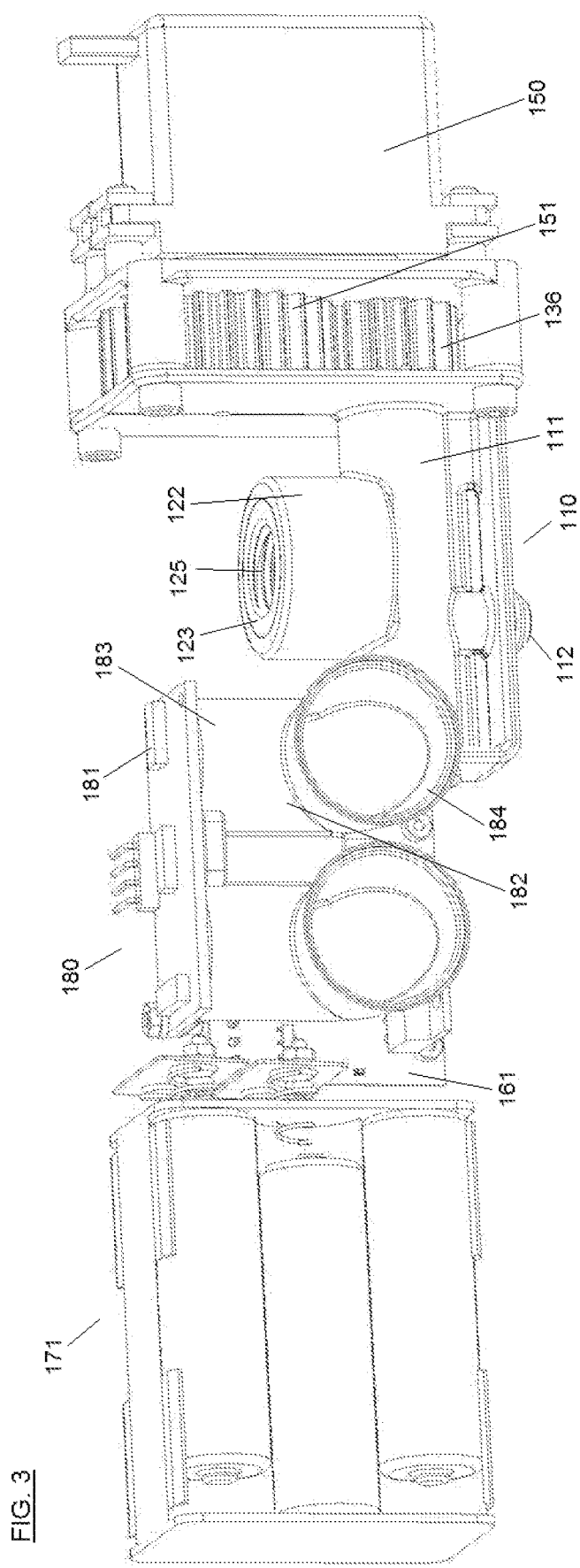
FIG. 3 is a perspective view of an animal sprayer device according to an embodiment of the present invention.

Without limiting the invention, FIGS. 1-3 show an exemplary embodiment of an animal sprayer device 100 according to an embodiment of the present invention. In some embodiments, said animal sprayer device 100 may comprise a valve 110 with a valve body 111 and a valve stem 130 for controlling a flow of water through said valve 110, a motor 150 for turning said valve stem 130, a pressure switch 160 for recognizing a threshold water pressure (e.g., 5 psi) from a water pipe, a proximity sensor 180 for detecting the presence of an animal within a target area, a power source 171, a voltage indicator 170 for indicating a power level of said power source 171 below a predetermined voltage, and a microcontroller 161 for: (1) receiving power from said power source 171 via said pressure switch 160, (2) sending a signal to a first transistor switch 164 to close a second circuit 173, bypassing said first circuit 172; (3) sending a signal to a second transistor switch 165 to activating said sensor 180, (4) receiving a positive detection signal from said sensor 180, (5) controlling said motor 150, and optionally, (6) activating said voltage indicator 170.

In some embodiments, said motor 150 may comprise a motor gear 151 and said valve stem 130 may comprise a stem gear 136, said motor gear 151 comprising a shape which is complementary to a shape of said stem gear 136. In some embodiments, said motor gear 151 may be in contact with said stem gear 136, such that when said motor 150 turns, said valve stem 130 also turns.

In some embodiments, said valve body 111 may comprise an inlet 112 with an inlet opening 113, and an outlet 122 with an outlet opening 123. In some embodiments, said inlet 113 opening may allow fluid communication between said water pipe and said valve 110. In some embodiments, said outlet opening 123 may comprise outlet threading 125, said outlet threading 125 comprising a shape which is complementary to a threading of a standard nozzle or service line, such that said valve 110 may be connected in a watertight manner to said standard nozzle or service line, said standard nozzle or service line directing said flow of water to said target area. In some embodiments, said valve 110 may thus provide fluid communication between said water pipe and said target area.

In some embodiments, said sensor 180 may comprise an ultrasonic sensor 181 and a sensor horn 182. In some embodiments, said ultrasonic sensor 181 may be operable to send out pulses of ultrasonic waves and measure the reflection of an object within a predetermined range of said sensor 180 (e.g., between 6 and 15 feet), said predetermined range representing said target area. In some embodiments, said sensor 180 may be operable to detect only animals meeting a threshold size (e.g., greater than 100 lbs. or greater than 12 sq. in.), said threshold size preventing said sensor from detecting smaller animals such as dogs, cats, birds, or rodents.

In some embodiments, the pulses of ultrasonic waves transmitted by said sensor 180 may also have the effect of deterring pests. The ultrasonic waves may be offensive to avian and rodent pests within a deterrent area (e.g., within 1 to 48 inches, or up to several feet) around the animal sprayer device 100, causing the pests to leave said deterrent area and thus leave the vicinity of said animal sprayer device 100. Said sensor 180 may thus prevent damage to said animal sprayer device 100 caused by physical contact by the pests, and prevent pest droppings in the vicinity of said animal sprayer device 100.

In some embodiments, said sensor horn 182 may comprise a substantially L shaped passage with a first end 183 and a second end 184, said L shaped passage providing protection for and directing ultrasonic waves to said ultrasonic sensor 181. In some embodiments, said ultrasonic sensor may be located at said first end 183, and said second end 184 may be open and directed toward said target area through one or more openings 186 in housing 101. In some embodiments, said sensor 180 may comprise a screen 185 (see FIG. 7A), said screen 185 covering said second end 184 and protecting said ultrasonic sensor 181 from water and debris. In some embodiments, said sensor 180 may comprise a plurality of ultrasonic sensors and a plurality of sensor horns. In some embodiments, each sensor horn in said plurality of sensor horns may be directed to said target area. In some embodiments, horn(s) 182 may be eliminated such that the sensor(s) 180 may be mounted flush to the housing 101.

Figure 13:
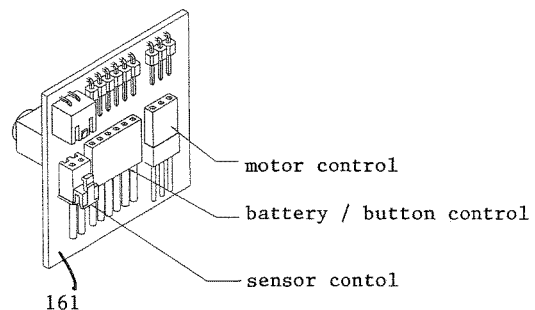
FIG. 13 is a detail view of an embodiment of a microprocessor of the present invention.

An alternative embodiment illustrated in FIGS. 9-12 shows the use of a single sensor 180. In such embodiments, an embodiment of housing 101 having a single sensor opening 186 may be employed. Or, as shown in FIGS. 9-12, any extra openings 186 in housing 101 may be plugged using caps 187. In the exemplary embodiment of FIGS. 9-12, it is seen that sensor 180 may be mounted generally flush with the external surface of housing 101. Sensor 180 is in electronic communication with microprocessor 161. FIG. 13 shows detail of an embodiment of a microprocessor illustrating the circuitry which controls the sensor (180), motor (150), and the battery/button/and voltage indicator (170).

In some embodiments, said sensor 180 may ping said target area multiple times per second (e.g., 20 times per second), and receive a positive detection if an animal moves into said target area. In some embodiments, said sensor 180 may require multiple consecutive positive detections (e.g., six consecutive positive detections) before recording a valid positive detection. In some embodiments, upon recording a valid positive detection, said sensor 180 may transmit a positive detection signal to said microcontroller 161, causing said microcontroller 161 to activate said motor 150, opening said valve 110, and spraying said animal.

In some embodiments, upon transmitting said positive detection signal to said microcontroller 161, said sensor 180 may cease pinging the target area, and said valve 110 may remain open for the duration of said spraying period. In other embodiments, said valve 110 may remain open for a predetermined spraying time (e.g. one minute, ten minutes, fifteen minutes, or any other suitable time period) before said microcontroller 161 activates said motor 150 to close said valve 110, thereby creating a spraying session. In some embodiments, said animal spraying device 100 may thus provide zero spraying sessions, or one spraying session, or a plurality of spraying sessions, during said spraying period.

In yet other embodiments, said sensor 180 may continue pinging said target area and upon receiving multiple consecutive negative detections (e.g. 50 consecutive negative detections) said sensor 180 may record a valid negative detection and send a negative detection signal to said microcontroller 161, causing said microcontroller 161 to activate said motor 150 and close said valve 110. In some embodiments, said sensor 180 may then continue pinging said target area for the duration of said spraying period, allowing for a second valid positive detection, thus allowing for multiple animals to be sprayed during said spraying period.

In some embodiments, said sensor 180 may receive power via either said first circuit 172 or said second circuit 173, via a second transistor switch 165. In such embodiments, said second transistor switch 165 may be operable to transfer power to said sensor 180 upon receiving an activation signal from said microcontroller 161, or a cut off power to said sensor 180 upon receiving a deactivation signal from said microcontroller 161. In some embodiments, said microcontroller 161 may automatically send said activation signal to said second transistor switch 165 upon said microcontroller 161 entering startup mode. In some embodiments, said microcontroller 161 may send said deactivation signal to said second transistor switch 165 upon entering low power mode.

In some embodiments, said power source 171 may comprise a battery. In some embodiments, said battery may comprise a plurality of commercially available batteries (e.g., AAA, AA, C, or D batteries, etc.). In some embodiments, said power source 171 may be in electronic communication with said pressure switch 160, said pressure switch 160 being in electronic communication with said microcontroller 161.

In some embodiments, said voltage indicator 170 may comprise a light emitting diode (LED) indicator and be operable to receive an activation signal from said microcontroller 161. In some embodiments, upon receiving said activation signal from said microcontroller 161, said LED indicator may be operable to pulse at a regular interval (e.g. one 0.5 second pulse every five seconds). In some embodiments, said LED indicator may continue to pulse at said regular interval until said microcontroller 161 sends a deactivation signal to said LED indicator.

Figure 4:
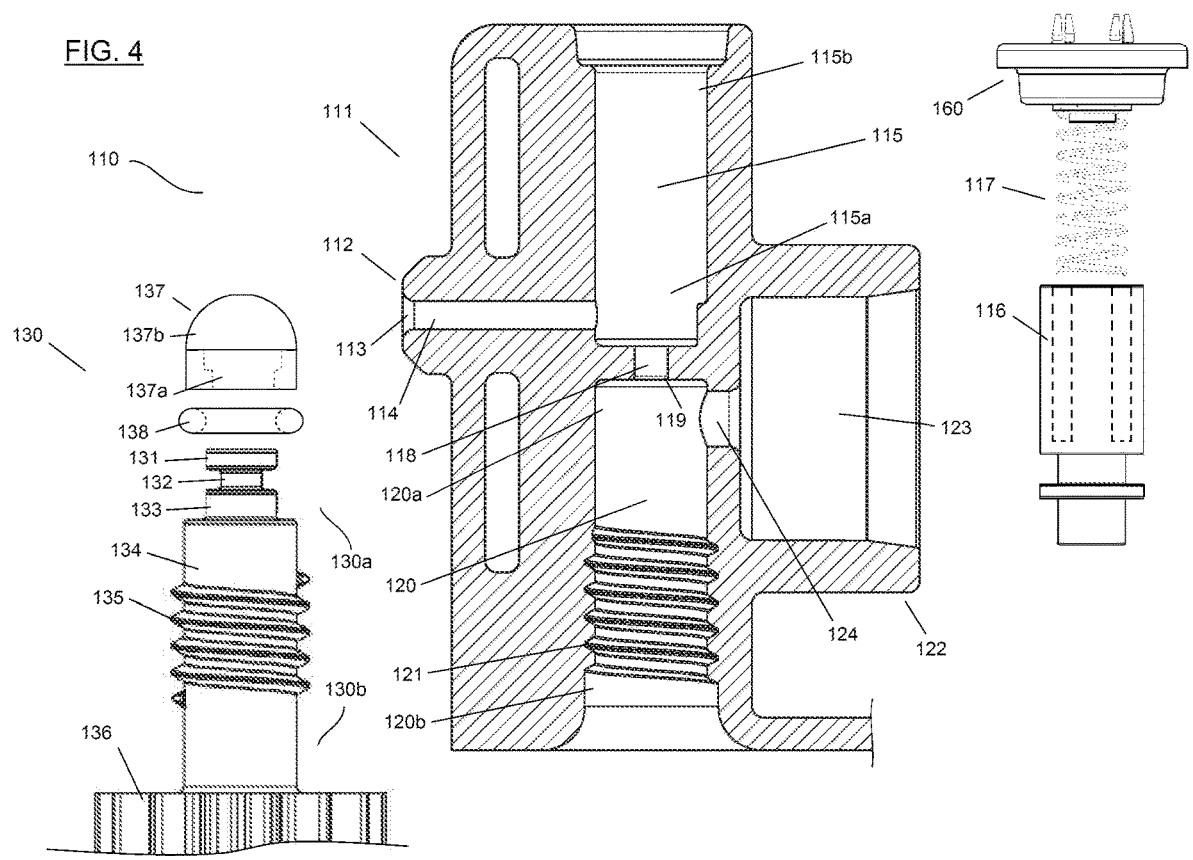
FIG. 4 is a perspective view of elements of an animal sprayer device according to an embodiment of the present invention.
Figure 5:
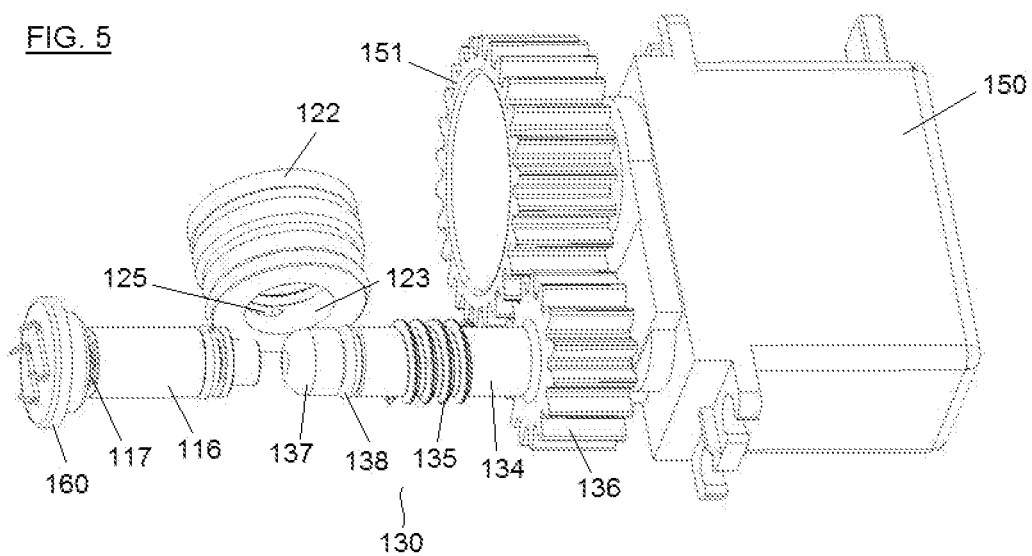
FIG. 5 is a side view of elements of an animal sprayer device according to an embodiment of the present invention.

Without limiting the invention, FIGS. 4 and 5 show an exemplary embodiment of an animal sprayer device 100 according to an embodiment of the present invention. In some embodiments, said animal sprayer device may comprise a valve 110 with a valve body 111 and a valve stem 130, and a motor 150 with a motor gear 151. In some embodiments, said valve body 111 may comprise said inlet 112, an inlet chamber 115, a seal passage 118, an outlet chamber 120, and an outlet 122. In some embodiments, said inlet 112 may comprise an inlet opening 113 and an inlet passage 114, said inlet passage 114 allowing fluid communication between said inlet opening 113 and said inlet chamber 115. In some embodiments, said inlet opening 113 may be in fluid communication with said water pipe via a watertight seal, said water pipe providing a threshold water pressure to said inlet 112 during a spraying period.

In some embodiments, said inlet chamber 115 may comprise a substantially cylindrical shape with a proximal end 115a and a distal end 115b. In some embodiments, said inlet passage 114 and said seal passage 118 may be located at said proximal end 115a, and said pressure switch 160 may be located at said distal end 115b.

In some embodiments, said inlet chamber 115 may house a pressure activated piston 116 and a spring 117. In some embodiments, said spring 117 may be located between said distal end 115b and said pressure activated piston 116, wherein said spring 117 provides physical resistance against contact between said pressure activated piston 116 and said pressure switch 160. In some embodiments, said threshold water pressure from said water pipe may overcome said physical resistance from said spring 117, causing said pressure activated piston 116 to contact said pressure switch 160 and close a first circuit 172 between said power source 171 and said microcontroller 161.

In some embodiments, said outlet chamber 120 may comprise a substantially cylindrical shape with a proximal end 120a, and a distal end 120b. In some embodiments, said seal passage 118 and said outlet 122 may be located at said proximal end 120a. In some embodiments, said outlet chamber or bore 120 may comprise a chamber threading 121, said chamber threading 121 being located at said distal end of said bore 120b.

In some embodiments, said seal passage 118 may comprise a substantially cylindrical shape with a tapered outlet end 119, said seal passage 118 providing fluid communication between said inlet chamber 115 and said outlet chamber 120.

In some embodiments, said valve stem 130 may comprise a first end 130a, a second end 130b, and a shaft 134. In some embodiments, said first end 130a may comprise a head 131, a neck 132, and a shoulder 133, said head 131 and said neck 132 creating a shape complementary to an inner cavity 137a of a plug 137, wherein said plug 137 fits securely onto said first end 130a. In some embodiments, said plug 137 may comprise a substantially hemispherical tip 137b, said substantially hemispherical tip 137b comprising a shape complementary to a shape of said tapered outlet end 119 of said seal passage 118, such that when said substantially hemispherical tip 137a contacts said tapered outlet end 119, a watertight seal is created between said seal passage 118 and said outlet chamber 120.

In some embodiments, an O-ring 138 may be provided on said shoulder 133, said O-ring 138 having an inner diameter and an outer diameter. In some embodiments, said inner diameter of said O-ring 138 may be complementary to an outer diameter of said shoulder 133, and said outer diameter of said O-ring 138 may be complementary to an inner diameter of proximal end 120a of said outlet chamber 120, such that a watertight seal is created between said proximal end 120a and said valve stem 130.

In some embodiments, said shaft 134 may comprise a substantially cylindrical shape with stem threading 135. In some embodiments, said stem threading 135 may comprise a shape complementary to said chamber threading 121, such that said valve stem 130 may be threaded into said outlet chamber 120. In some embodiments, said second end 130b may comprise a stem gear 136, said stem gear 136 comprising a shape complementary to a shape of said motor gear 151.

In some embodiments, said stem gear 136 may be in contact with said motor gear 151, such that when said motor 150 turns said motor gear 151 in first direction, said valve stem 130 may be threaded into said outlet chamber 120, moving along central axis of said valve stem 130, and when said motor 150 turns said motor gear 151 in a second direction, said valve stem 130 may be threaded out of said outlet chamber 120, moving back along said central axis of said valve stem 130 (collectively, an axial movement).

In some embodiments, when said valve stem 130 is threaded into said outlet chamber 120, said plug 137 may come into contact with said seal passage 118, closing said valve 110, and when said valve stem 130 is threaded out of said outlet chamber 120, said plug 137 may disengage from said seal passage 118, opening said valve 110 and allowing said flow of water to pass from said inlet chamber 115 through said sealing passage 118 and around said plug 137 in a symmetrical manner before exiting said outlet chamber 120 through said outlet passage 124 and out said outlet 122 via said outlet opening 123. In some embodiments, the rate of said flow of water passing through said valve 110 may be linearly proportional to said axial movement of said valve stem 130.

Said valve 110 may thus provide a linear increase in water volume as said valve stem 130 is threaded out of said valve body 120. Further, said valve 110 may be self-cleaning, as said symmetrical manner of water flow through said sealing passage 118 and around said plug 137 prevents buildup of debris or sediment in said valve 110, decreasing the need for maintenance and the likelihood of developing a leak.

Figure 6:
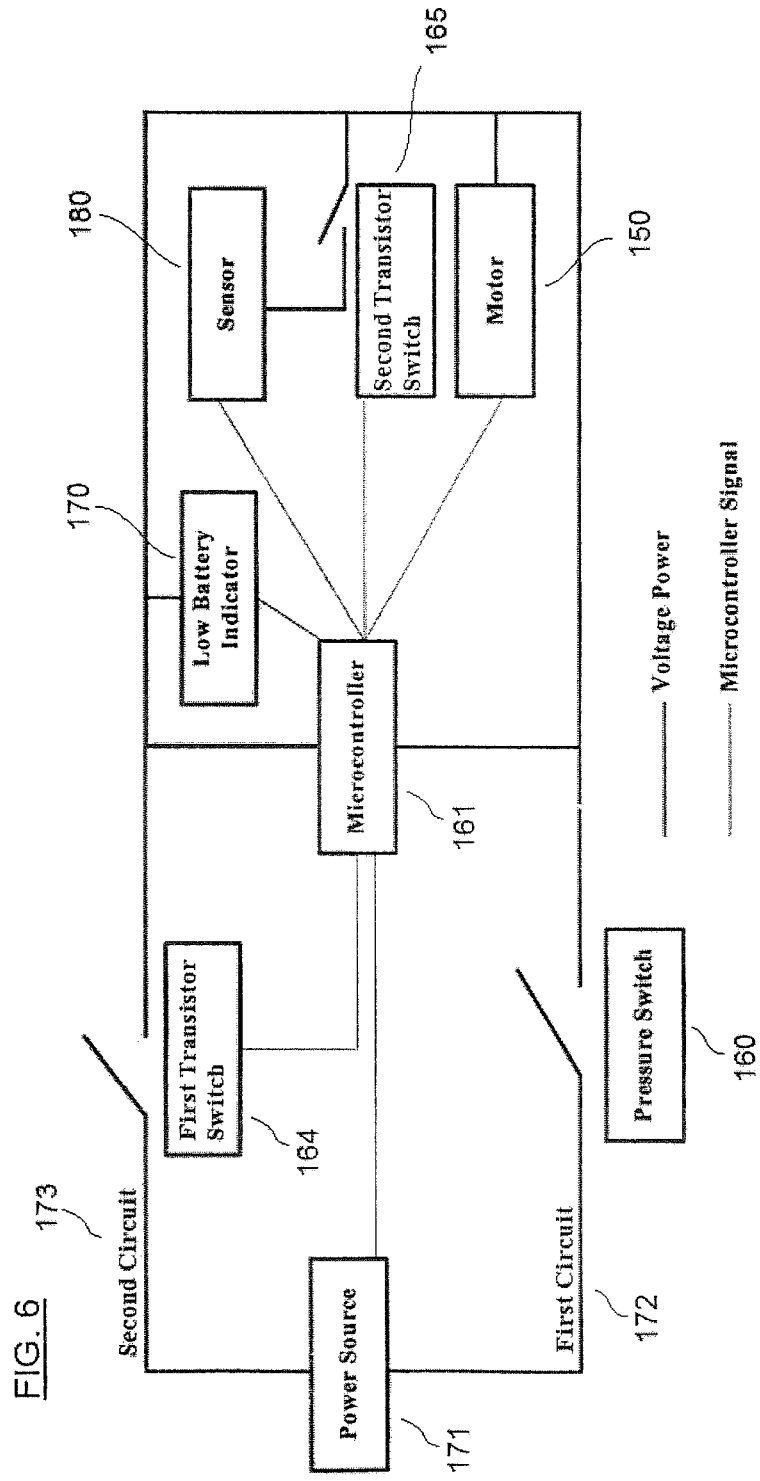
FIG. 6 is a schematic diagram of circuitry of an animal sprayer device according to an embodiment of the present invention.

Without limiting the invention, FIG. 6 shows a schematic diagram of an exemplary embodiment of circuits of an animal sprayer device 100 according to an embodiment of the present invention. In some embodiments, said pressure switch 160 may be capable of opening or closing a first circuit 172 between said power source 171 and said microcontroller 161. In some embodiments, said pressure switch 160 may open said first circuit 172 when said pressure activated piston 116 (see FIGS. 4 and 5) is not in contact with said pressure switch 160, and close said first circuit 172 when said pressure activated piston 116 is in contact with said pressure switch 160.

In some embodiments, said power source 171 may be in electronic communication with a first transistor switch 164, said first transistor switch 164 being in electronic communication with said microcontroller 161. In some embodiments, said first transistor switch 164 may be capable of opening or closing a second circuit 173 between said power source 171 and said microcontroller 161. In some embodiments, said first transistor switch 164 may close said second circuit 173 upon receiving a signal from said microcontroller 161, said microcontroller 161 automatically signaling said first transistor switch 164 to close said second circuit 173 after said microcontroller 161 receives power via said first circuit 172, thus bypassing said first circuit 172. In some embodiments, said microcontroller 161 may not signal said first transistor switch 164 to open said second circuit 173 after said first circuit 172 opens at the end of a spraying period, so that said microcontroller 161 may cause said motor 150 to close said valve 110 after said spraying period has ended. In some embodiments, said microcontroller 161 may then signal said first transistor switch 164 to open said second circuit 173, conserving power from said power source 171.

In some embodiments, said microcontroller 161 may continuously monitor the voltage level from said power source 171 via said first circuit 172 (first circuit voltage), and enter a low power mode upon said first circuit voltage dropping below a predetermined voltage (e.g., 7.4 volts). In some embodiments, upon entering said low power mode, said microcontroller 161 may not signal said first transistor switch 164 to open said second circuit 173 at the end of a spraying period, but instead may signal a second transistor switch 165 to cut off power to said sensor 180. Thus, said second circuit 173 may remain closed for the purpose of powering a voltage indicator 170, but said sensor may not draw any power from said power source 171, conserving battery power. In some embodiments, said animal sprayer device 100 may be capable of operating in low power mode until said first circuit voltage drops below a minimum voltage (e.g. 4.5 volts).

In some embodiments, if said animal sprayer device 100 is in low power mode, said microcontroller 161 may not close said valve 110 when a spraying period ends, thus conserving power and ensuring that said valve 110 is in an open position for the next spraying period. In other embodiments, said microcontroller 161 may close said valve 110 at the end of a spraying period irrespective of whether said animal sprayer device 100 is in said low power mode.

In some embodiments, said microcontroller 161 may exit said low power mode upon said first circuit voltage rising above said predetermined voltage.

In some embodiments, said voltage indicator 170 may comprise a light emitting diode (LED) indicator and be operable to receive power from said microcontroller 161 upon said microcontroller 161 entering said low power mode. In some embodiments, upon receiving an activation signal from said microcontroller 161, said LED indicator may be operable to pulse at a regular interval (e.g. one 0.5 second pulse every five seconds), alerting a user that a power level of said power source 171 has dropped below said predetermined voltage. In some embodiments, said LED indicator may continue to pulse at said regular interval until said microcontroller 161 signals said LED indicator to shut down. In some embodiments, said microcontroller 161 may signal said LED indicator to shut down upon said first circuit voltage rising above said predetermined voltage.

In some embodiments, said microcontroller 161 may comprise a central processing unit (CPU), said CPU being in electronic communication with said pressure switch 160, said first transistor switch 164, said second transistor switch 165, said motor 150, said sensor 180, and said voltage indicator 170. In some embodiments, said microcontroller 161 may be operable to receive power from said power source 171 via a first circuit 172 or a second circuit 173, said first circuit 172 being opened or closed by said pressure switch 160, and said second circuit 173 being opened or closed by said first transistor switch 164. In some embodiments, said pressure switch 160 may close said first circuit 172 upon said water pipe delivering said threshold water pressure to said valve 110 during a spraying period, and open said first circuit 172 at the end of said spraying period.

In some embodiments, upon receiving power from said first circuit 172, said microcontroller 161 may automatically signal said first transistor switch 164 to close said second circuit 173, bypassing said first circuit 172. In such embodiments, said microcontroller 161 may continuously monitor a first circuit voltage, and enter a shut-down mode upon said first circuit being opened. In some embodiments, said second circuit 173 may thus provide power to said microcontroller 161 during a spraying period as well as after said first circuit 172 is opened at the end of said spraying period. In such embodiments, said microcontroller 161 may enter said shut-down mode, wherein said microcontroller 161 may cause said motor 150 to close said valve 110, and then signal said first transistor switch 164 to open said second circuit 173. Upon said second circuit 173 being opened, power is cut off to said microcontroller 161, said sensor 180, said motor 150, and said voltage indicator 170.

In some embodiments, said microcontroller 161 may be operable to: (1) receive power from said power source 171 via the closing of said first circuit 172; (2) transmit power to said first transistor switch 164, closing said second circuit 173; (3) automatically transmit a negative detection signal to said motor 150 to initially close said valve 110 and conserve water; (4) send a signal to said second transistor switch 165 to activate said sensor 180; (5) receive a positive detection signal from said sensor 180 upon an animal entering a target area; (6) transmit said positive detection signal to said motor 150 to open said valve 110; (7) receive a negative detection signal from said sensor 180 upon said animal leaving said target area; (8) transmit said negative detection signal to said motor 150 to close said valve 110 and conserve water; (9) monitor a first circuit voltage; (10) upon said first circuit voltage dropping below said predetermined voltage, enter said low power mode and activate said voltage indicator 170, causing said voltage indicator to pulse at a regular interval; (11) upon said first circuit 172 being opened while not in said low power mode, close said valve 110 and signal said first transistor switch 164 to open said second circuit 173, shutting off power to said microcontroller 161; (12) upon said first circuit 172 being opened while in said low power mode, either close said valve 110 to conserve water or leave said valve 110 open to conserve power, and signal said second transistor switch 165 to cut off power to said sensor 180, conserving battery power, and (13) upon said first circuit voltage rising above said predetermined voltage, exit said low power mode.

Figure 7:
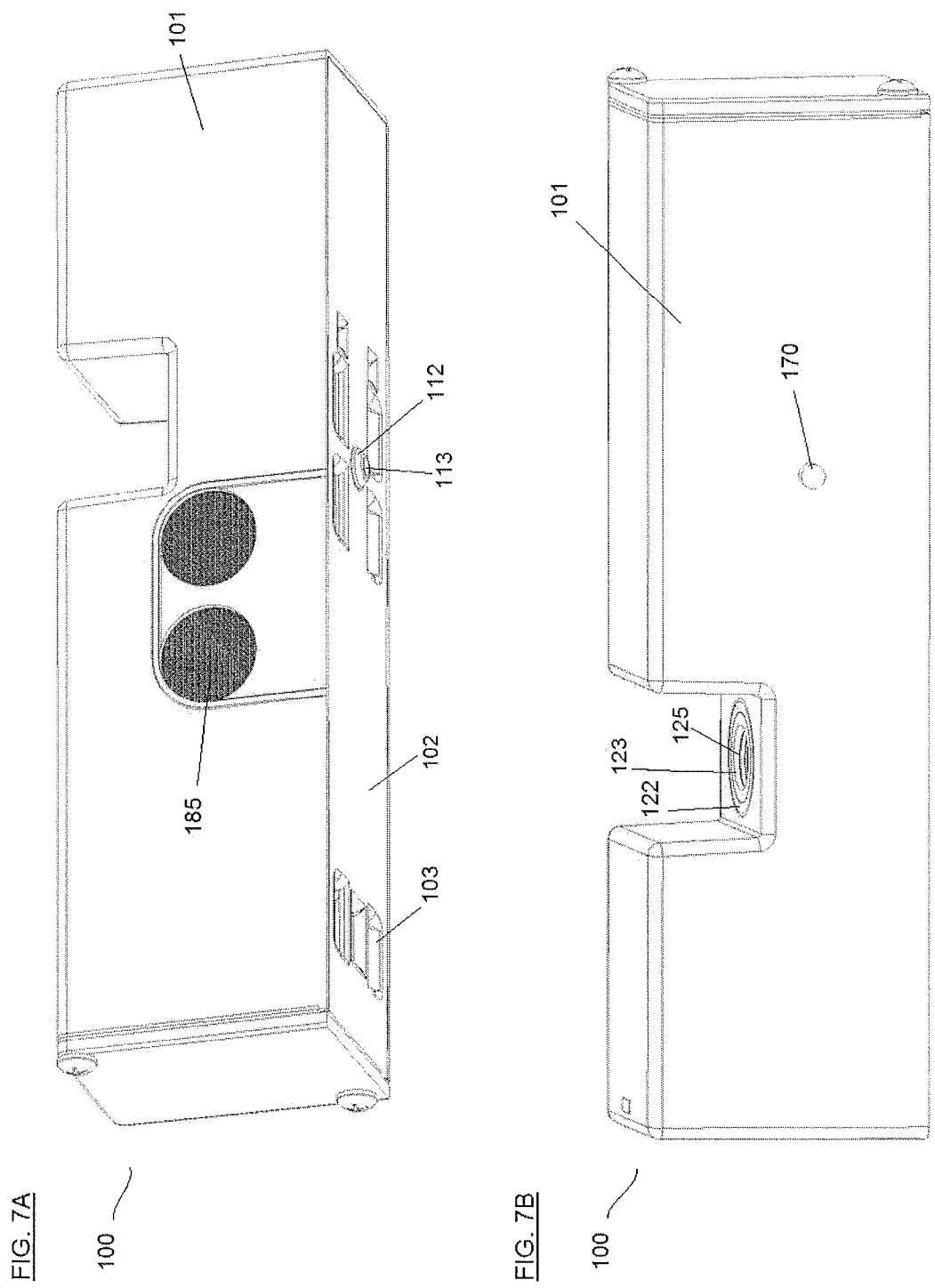
FIG. 7A is a front perspective view of an embodiment of a housing for an animal sprayer device of the present invention.
FIG. 7B is a rear perspective view of an embodiment of a housing for an animal sprayer device of the present invention.

Without limiting the invention, FIGS. 7A and 7B show an exemplary embodiment of an animal sprayer device 100 according to an embodiment of the present invention. In some embodiments, said animal sprayer device 100 may comprise a housing 101. In some embodiments, said housing 101 may comprise a rigid material (e.g., plastic or metal) and may comprise openings for said inlet 112, said outlet 122, said sensor 180, and said voltage indicator 170. In some embodiments, said sensor 180 may comprise a screen 185, said screen 185 being located at said second end 184 of said sensor horn 182, protecting said ultrasonic sensor 181 from water and debris. In some embodiments, said housing may further comprise a bottom surface 102 with at least one attachment tab 103.

Figure 8:
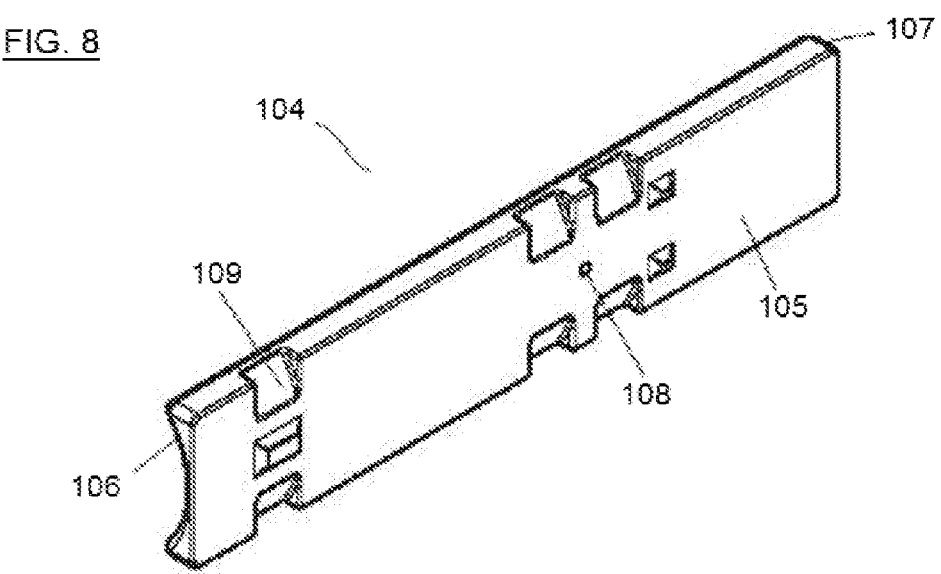
FIG. 8 is a perspective view of a mounting structure for an embodiment of the present invention.
Figure 12:
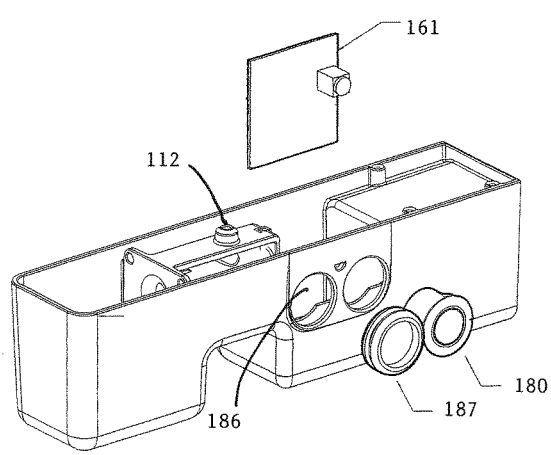
FIG. 12 is partially exploded perspective view of the embodiment of FIG. 9.

Without limiting the invention, FIG. 8 shows an exemplary embodiment of elements of an animal sprayer device 100 according to an embodiment of the present invention. In some embodiments, said housing 101 may further comprise a pipe gasket 104 for mounting said sprayer device 100 to said water pipe. In some embodiments, said pipe gasket 104 may comprise an upper surface 105, a rounded first end 106, and a rounded second end 107. In some embodiments, said upper surface 105 may comprise a substantially flat shape, a passage 108 for said inlet, and at least one attachment slot 109 for attaching to said at least one attachment tab 103. In some embodiments, said rounded first end 106 and said rounded second end 107 may each comprise a shape which is complementary to an outer surface of said water pipe.

It is to be understood that there are several variations in the animal sprayer device, and that the foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An animal spraying apparatus comprising:
   a. a timer for controlling when water is supplied from a water source;
   b. a pressure-operated switch in communication with the water source, the switch closing when water from said source reaches a threshold pressure level, and opening when the pressure level of said water drops below said threshold level, the switch controlling a first circuit for providing power to: (i) a proximity sensor for detecting the presence of an animal in the vicinity of said sensor; (ii) a valve in fluid communication with the water source; and (iii) a microprocessor in electronic communication with said valve and said proximity sensor;
   c. a housing for protecting said switch, valve, microprocessor, and sensor, said housing comprising a rigid material and having at least one exterior surface having a shape that is complementary to a shape of an exterior surface of a water pipe for secure attachment thereto; and
   d. programming in said microprocessor for opening said valve upon the detection of the presence of an animal by said proximity sensor.

2. The apparatus of claim 1 further comprising programming in said microprocessor for closing said valve when the water pressure drops below said threshold level.

3. The apparatus of claim 1 further comprising programming in said microprocessor for closing said valve when the presence of an animal is no longer detected by said proximity sensor.

4. The apparatus of claim 1 further comprising programming in said microprocessor for deactivating said proximity sensor following the detection of the presence of an animal.

5. The apparatus of claim 4 further comprising programming in said microprocessor for closing said valve when the water pressure drops below said threshold level.

6. The apparatus of claim 1 further comprising a second switch in electronic communication with said microprocessor for controlling a second circuit for providing power to said microprocessor, and programming in said microprocessor for (i) closing said second switch when power is first received through said first circuit to maintain power to said microprocessor through said second circuit should power from said first circuit be lost, and (ii) monitoring said first circuit in order to close said valve and open said second switch should power through said first circuit be lost.

7. The apparatus of claim 1 wherein power is provided from at least one battery.

8. The apparatus of claim 7 wherein said at least one battery is removable.

9. The apparatus of claim 7 wherein said at least one battery is rechargeable.

10. The apparatus of claim 1 wherein power is provided from a solar power source.

11. The apparatus of claim 1 wherein power is provided from an alternating current (AC) line.

12. The apparatus of claim 1 wherein power is provided from a direct current (DC) line.

13. The apparatus of claim 1 further comprising a pump that is controlled by said timer.

14. A method for spraying animals in hot or dry weather comprising the steps of:
   a. providing water under pressure through a pipe at predetermined times;
   b. detecting that water pressure in the pipe has reached a threshold level, and activating a microprocessor when said threshold is reached;
   c. when said pressure reaches said threshold level, said microprocessor activating a proximity sensor for detecting the presence of an animal in a given area; and
   d. if at least one animal of sufficient size is detected by said proximity sensor, said microprocessor opening a valve to a water sprayer.

15. The method of claim 14 comprising the additional step of closing said valve if said water pressure drops below said threshold level.

16. The method of claim 14 comprising the additional step of closing said valve if the presence of an animal is no longer detected by said proximity sensor.

17. The method of claim 14 comprising the additional step of deactivating said proximity sensor following the detection of the presence of an animal.

18. The method of claim 17 comprising the additional step of closing said valve if said water pressure drops below said threshold level.

19. An animal spraying apparatus comprising:
   a. a pressure-operated switch in communication with the water source, the switch closing when water from said source reaches a threshold pressure level, and opening when the pressure level of said water drops below said threshold level, the switch controlling a first circuit for providing power to: (i) a proximity sensor for detecting the presence of an animal in the vicinity of said sensor; (ii) a valve in fluid communication with the water source; and (iii) a microprocessor in electronic communication with said valve and said proximity sensor;
   b. a housing for protecting said switch, valve, microprocessor, and sensor, said housing comprising a rigid material and having at least one exterior surface having a shape that is complementary to a shape of an exterior surface of a water pipe for secure attachment thereto; and
   c. programming in said microprocessor for opening said valve upon the detection of the presence of an animal by said proximity sensor.

20. The apparatus of claim 19 further comprising programming in said microprocessor for closing said valve when the water pressure drops below said threshold level.

21. The apparatus of claim 19 further comprising programming in said microprocessor for closing said valve when the presence of an animal is no longer detected by said proximity sensor.

22. The apparatus of claim 19 further comprising programming in said microprocessor for deactivating said proximity sensor following the detection of the presence of an animal.

23. The apparatus of claim 22 further comprising programming in said microprocessor for closing said valve when the water pressure drops below said threshold level.

* * * * *